United States Patent
Otomo

(10) Patent No.: US 6,288,850 B1
(45) Date of Patent: Sep. 11, 2001

(54) IMAGE READOUT LENS AND IMAGE READOUT APPARATUS

(75) Inventor: Ryoko Otomo, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/510,293

(22) Filed: Feb. 22, 2000

(30) Foreign Application Priority Data

Mar. 2, 1999 (JP) .................................................. 11-054035

(51) Int. Cl.⁷ .............................. G02B 9/34; G02B 13/18
(52) U.S. Cl. ........................................... 359/773; 359/715
(58) Field of Search ........................... 359/773, 771–772, 359/754–756, 757–758, 763–764, 766, 715

(56) References Cited

U.S. PATENT DOCUMENTS

| | | | |
|---|---|---|---|
| 4,606,607 | * 8/1986 | Kurihara | 359/715 |
| 4,695,134 | * 9/1987 | Nakayama et al. | 359/715 |
| 5,499,142 | * 3/1996 | Ohshita | 359/773 |
| 5,936,783 | * 8/1999 | Nakai et al. | 359/773 |
| 6,147,811 | * 11/2000 | Fujibayashi | 359/689 |

FOREIGN PATENT DOCUMENTS

5926715-A  *  2/1984 (JP) .

OTHER PUBLICATIONS

Japanese Patent Office, Patent Abstracts of Japan, Publication No.: 09101452 A, Date of Publication: Apr. 15,1997.

* cited by examiner

Primary Examiner—Jordan M. Schwartz
(74) Attorney, Agent, or Firm—Snider & Associates; Ronald R. Snider

(57) ABSTRACT

A bright image readout lens having a wider angle of view comprises, successively from the object side, a first lens $L_1$ made of a positive meniscus lens having a convex surface directed onto the object side, a second lens $L_2$ made of a biconcave lens, a third lens $L_3$ made of a biconvex lens, and a fourth lens $L_4$ made of a negative meniscus lens having a convex surface directed onto the imaging surface side, wherein at least one surface in at least one of the first lens $L_1$ and third lens $L_3$ is an aspheric surface, and wherein a stop is disposed between the second lens $L_2$ and the third lens $L_3$. This image readout lens favorably corrects various kinds of aberration.

4 Claims, 10 Drawing Sheets

EXAMPLES 1 & 2

EXAMPLES 3 & 4

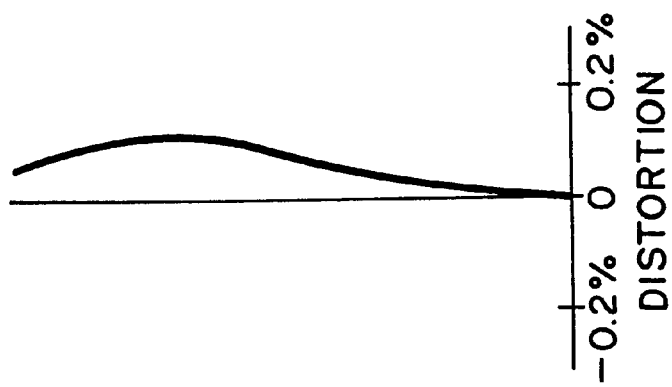
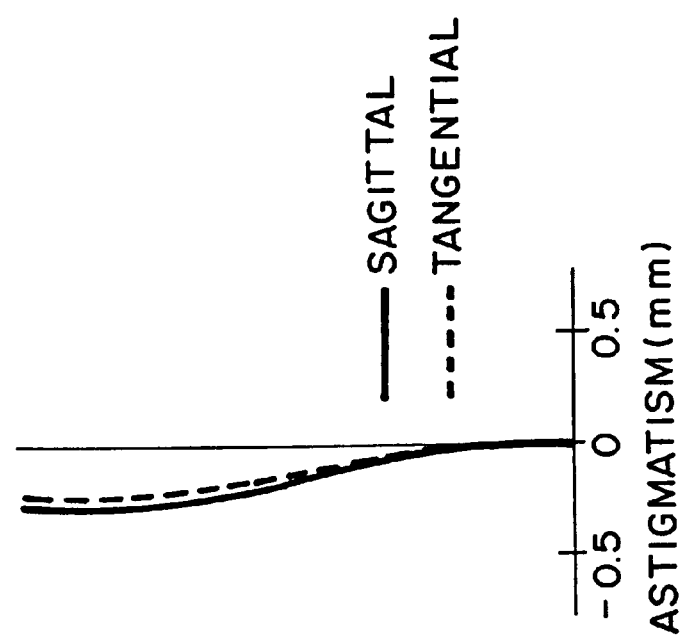
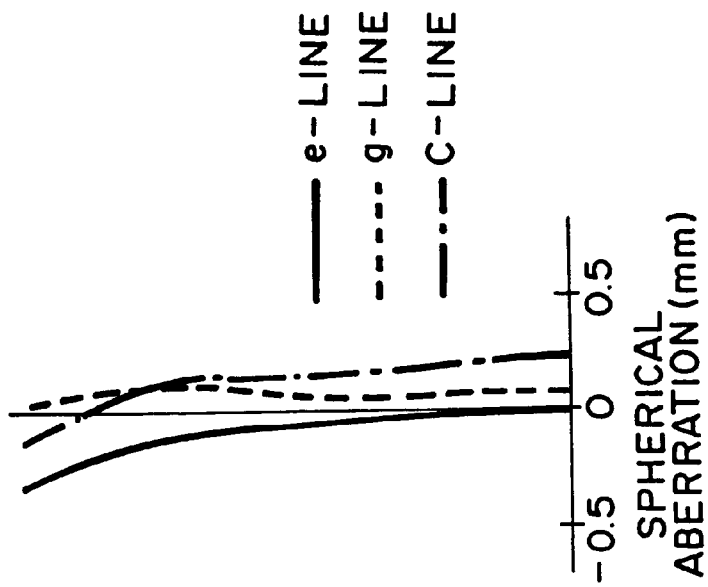

EXAMPLE 1

EXAMPLE 1

EXAMPLE 1

EXAMPLE 1

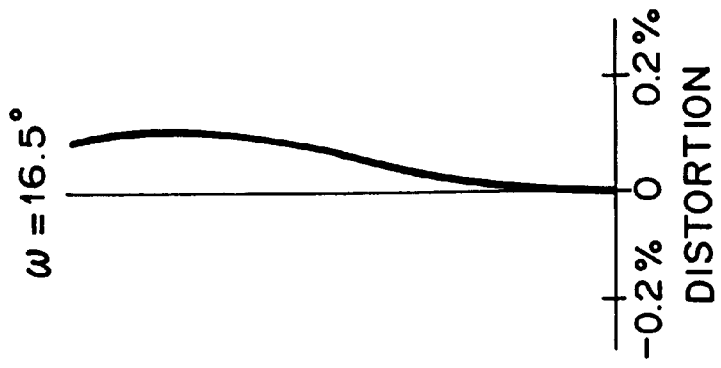
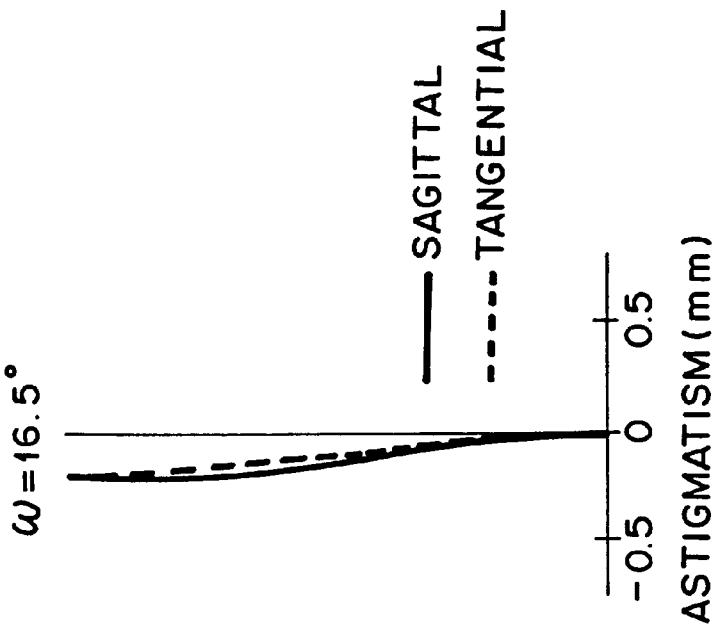

EXAMPLE 2

EXAMPLE 2

EXAMPLE 2

EXAMPLE 2

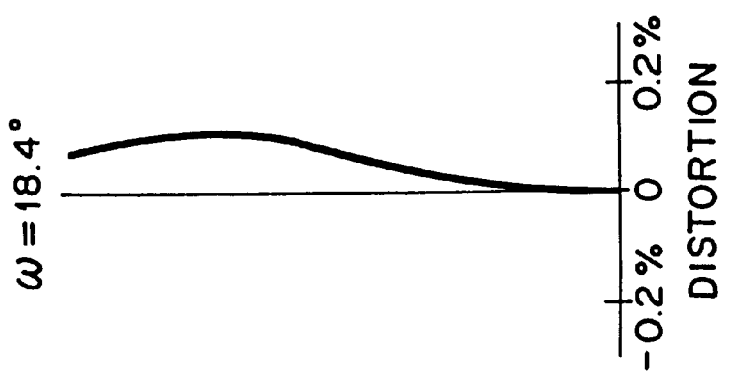
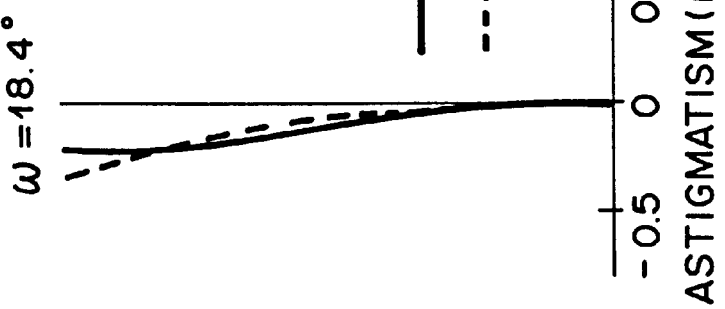
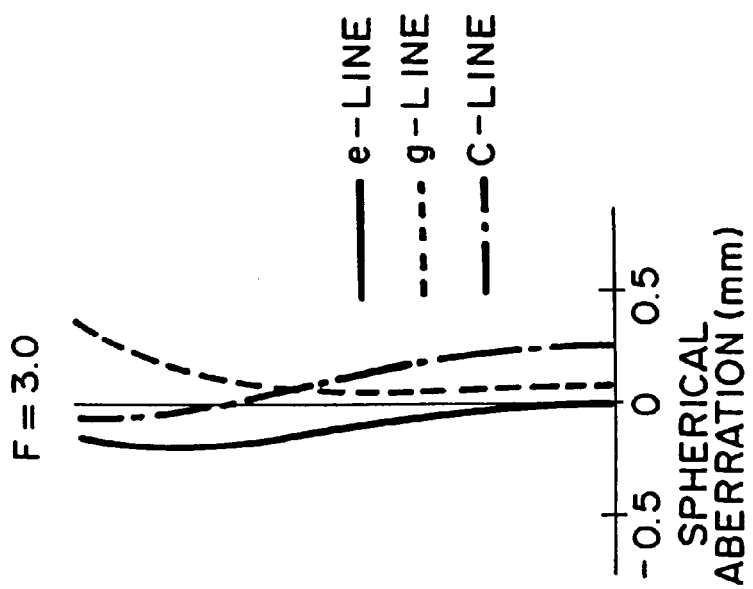

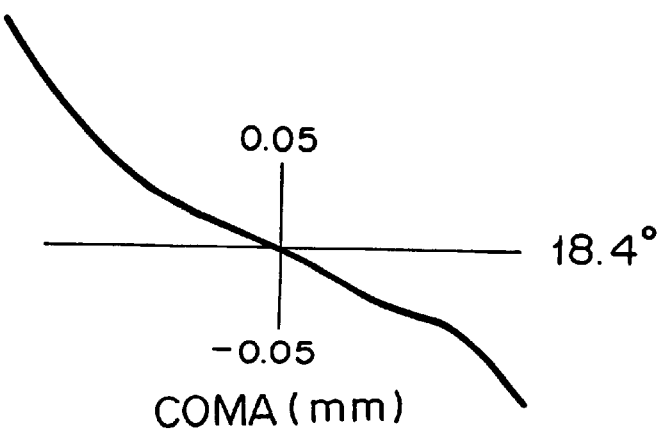
FIG.8A EXAMPLE 3
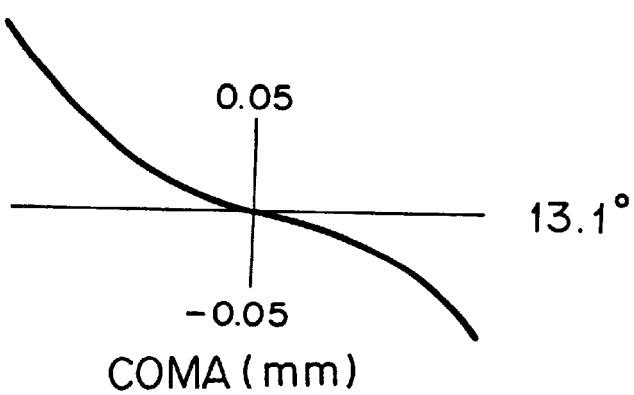
FIG.8B EXAMPLE 3
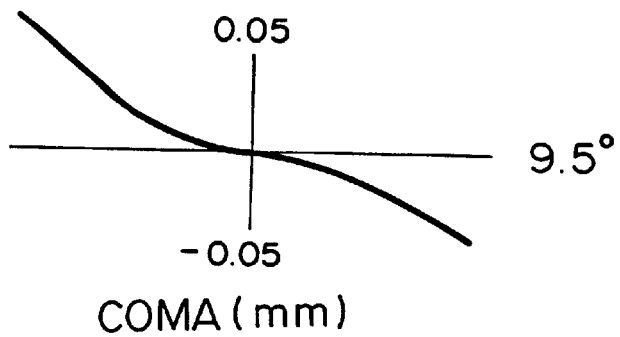
FIG.8C EXAMPLE 3
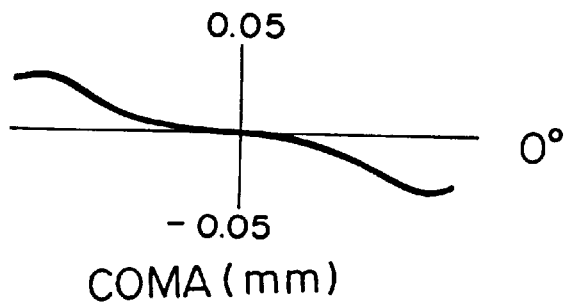
FIG.8D EXAMPLE 3

FIG.9C EXAMPLE 4
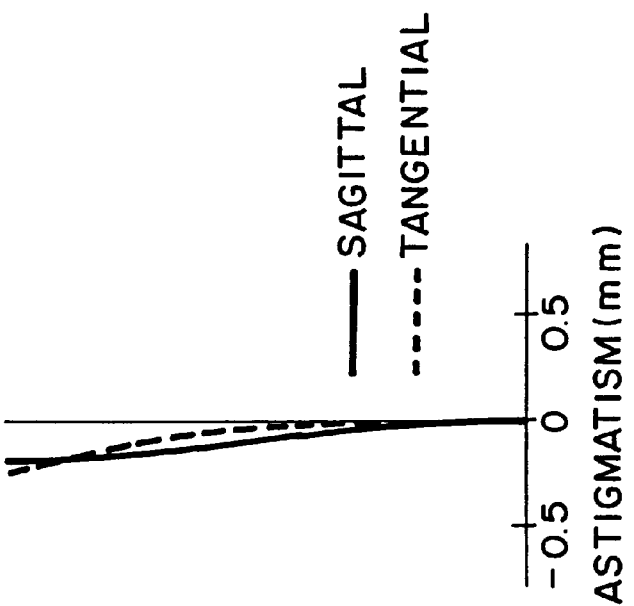
FIG.9B EXAMPLE 4
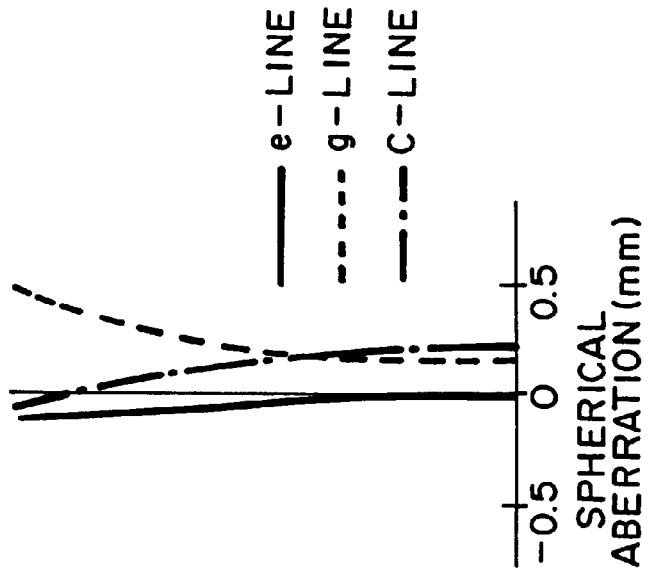
FIG.9A EXAMPLE 4

EXAMPLE 4

EXAMPLE 4

EXAMPLE 4

EXAMPLE 4

IMAGE READOUT LENS AND IMAGE READOUT APPARATUS

RELATED APPLICATIONS

This application claims the priority of Japanese Patent Application No. 11-054035 filed on Mar. 2, 1999, which is incorporated herein by reference.

BACKGROUND OF THE INVENTION

1. Field of the Invention

The present invention relates to an image readout apparatus such as a facsimile machine, image scanner, or the like; and an image readout lens employed as an optical system thereof. In particular, the present invention relates to an image readout lens for reducing or enlarging images, and an image readout apparatus using the same.

2. Description of the Prior Art

Imaging lenses for reading out images employed in facsimile machines, image scanners, and the like of a type in which a reduced or enlarged image of an original is formed onto an imaging device such as CCD are basically required to have a high resolution at the imaging magnification in use, a large amount of marginal illumination, and a low distortion. In addition, along with recent demands for making the whole optical apparatus more compact and less expensive, these lenses are required to have a compact size and to be made at a lower cost.

As an imaging lens which can fulfill these requirements, one having a four-element configuration disclosed in Japanese Unexamined Patent Publication No. 9-101452 has been known.

Though the four-element imaging lens disclosed in the above-mentioned publication can yield a favorable quality of readout images over a wide angle, brighter image readout lenses have been desired for use in line sensors for copiers and the like in view of demands for higher readout speed.

SUMMARY OF THE INVENTION

In view of such circumstances, it is an object of the present invention to provide an inexpensive, bright image readout lens, composed of four lens elements, which is capable of yielding a wider angle of view and a favorable quality of readout images.

It is another object of the present invention to provide an image readout apparatus using such an image readout lens.

The image readout lens in accordance with the present invention comprises, successively from an object side, a first lens made of a positive meniscus lens having a convex surface directed onto the object side, a second lens made of a biconcave lens, a third lens made of a biconvex lens, and a fourth lens made of a negative meniscus lens having a convex surface directed onto an imaging surface side, wherein at least one surface in at least one of the first and third lenses is an aspheric surface, and wherein a stop is disposed between the second and third lenses.

Preferably, the image readout lens in accordance with the present invention is configured so as to satisfy the following conditions:

$$1.38 < f(1/R_9 - 1/R_8) < 2.38 \quad (1)$$

$$0.28 < R_1/f < 0.58 \quad (2)$$

$$0.23 < D_7/f < 0.46 \quad (3)$$

$$0.71 < |D_4 \times f_2|/f < 1.98 \quad (4)$$

$$1.14 < |N_4 \times f_4|/f < 1.90 \quad (5)$$

where f is the composite focal length of the whole lens system;
$f_2$ is the focal length of the second lens;
$f_4$ is the focal length of the fourth lens;
$R_i$ is the radius of curvature of the i-th surface;
$D_i$ is the distance between the i-th surface and the (i+1)-th surface; and
$N_4$ is the refractive index of the fourth lens at e-line.

The image readout apparatus in accordance with the present invention uses the above-mentioned image readout apparatus.

While the image readout lens in accordance with the present invention can be used as an image reducing lens when the first to fourth lenses are successively disposed from the object side as mentioned above, it can also be used as an image enlarging lens when the direction of the whole lens system is reversed as it is so that the first to fourth lenses are successively disposed from the imaging surface side.

BRIEF DESCRIPTION OF THE DRAWINGS

FIGS. 3A, 3B and 3C are aberration charts (indicating spherical aberration, astigmatism, and distortion) of the lens in accordance with Example 1;

FIGS. 5A, 5B and 5C are aberration charts (indicating spherical aberration, astigmatism, and distortion) of the lens in accordance with Example 2;

FIGS. 7A, 7B and 7C are aberration charts (indicating spherical aberration, astigmatism, and distortion) of the lens in accordance with Example 3;

FIGS. 8A, 8B, 8C and 8D are aberration charts (indicating coma) of the lens in accordance with Example 3;

FIGS. 9A, 9B and 9C are aberration charts (indicating spherical aberration, astigmatism, and distortion) of the lens in accordance with Example 4;

DESCRIPTION OF THE PREFERRED EMBODIMENTS

In the following, embodiments of the present invention will be explained with reference to the accompanying drawings.

Figure 11:
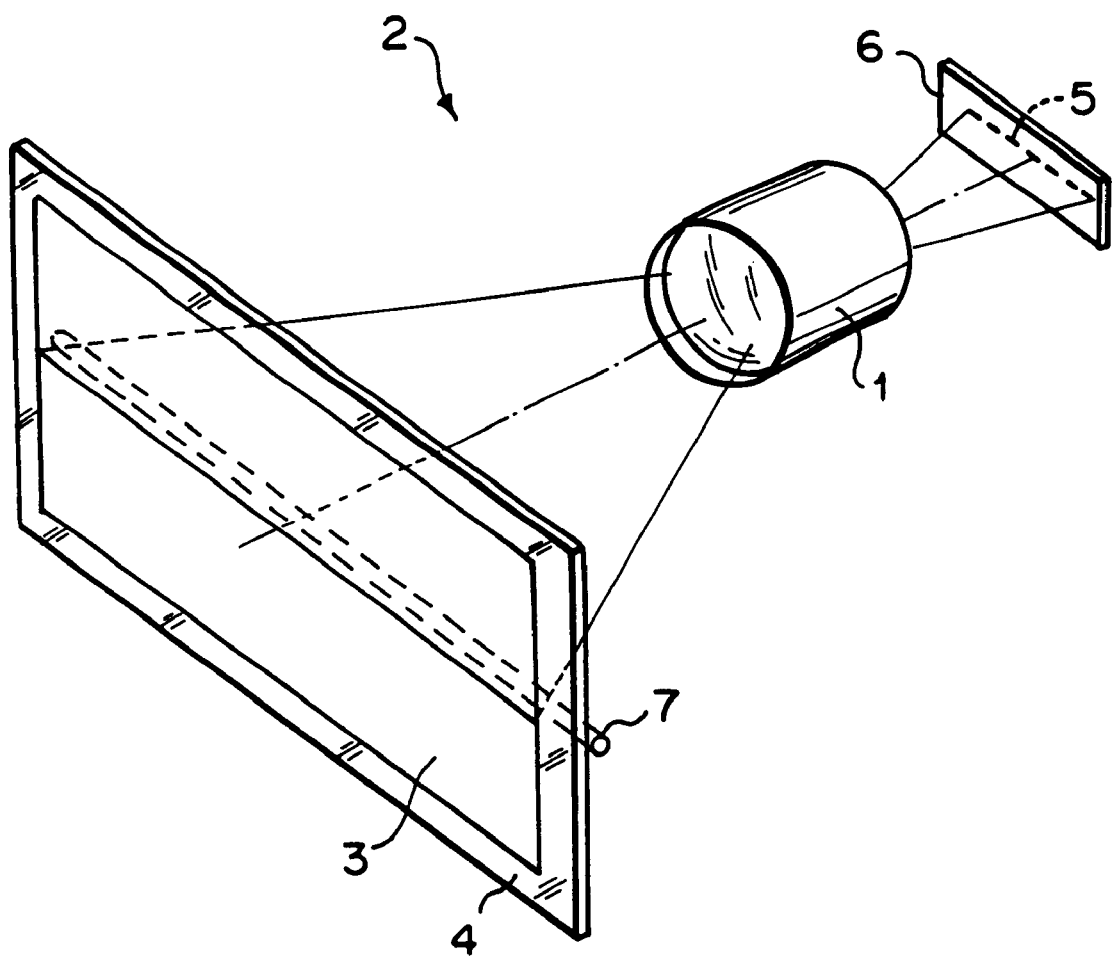
FIG. 11 is a schematic view showing the image readout apparatus in accordance with an embodiment of the present invention.

As shown in FIG. 11, the imaging lens 1 for reading out images (image readout lens) in accordance with the present invention is used in an optical system of an image readout apparatus 2 such as a facsimile machine, image scanner, or the like. In this image readout apparatus 2, the imaging lens 1 is disposed between a glass plate 4 for mounting an original 3 and a cover glass 6 of a linear CCD 5, whereas an illuminating device 7 is disposed on the imaging lens side from the glass plate 4.

In the image readout apparatus 2, when the original 3 is illuminated with light from the illuminating device 7, then a luminous flux reflected by the original 3 forms an image by way of the imaging lens 1, so as to be read out by the linear CCD 5.

Figure 1:
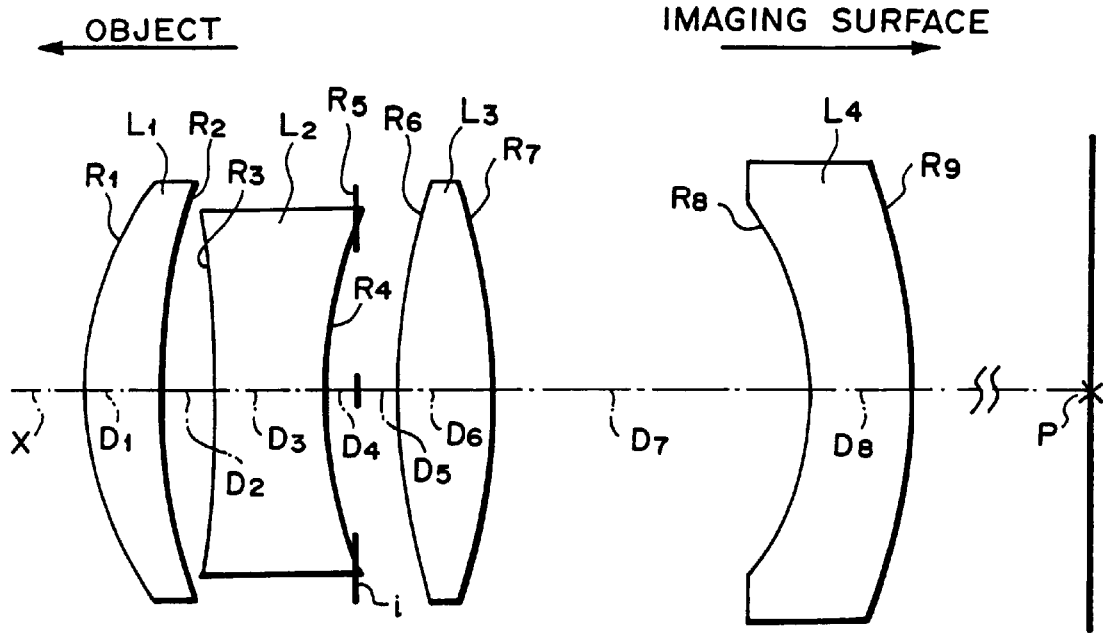
FIG. 1 is a schematic view showing a basic lens configuration in accordance with Examples 1 and 2 of the present invention.
Figure 2:
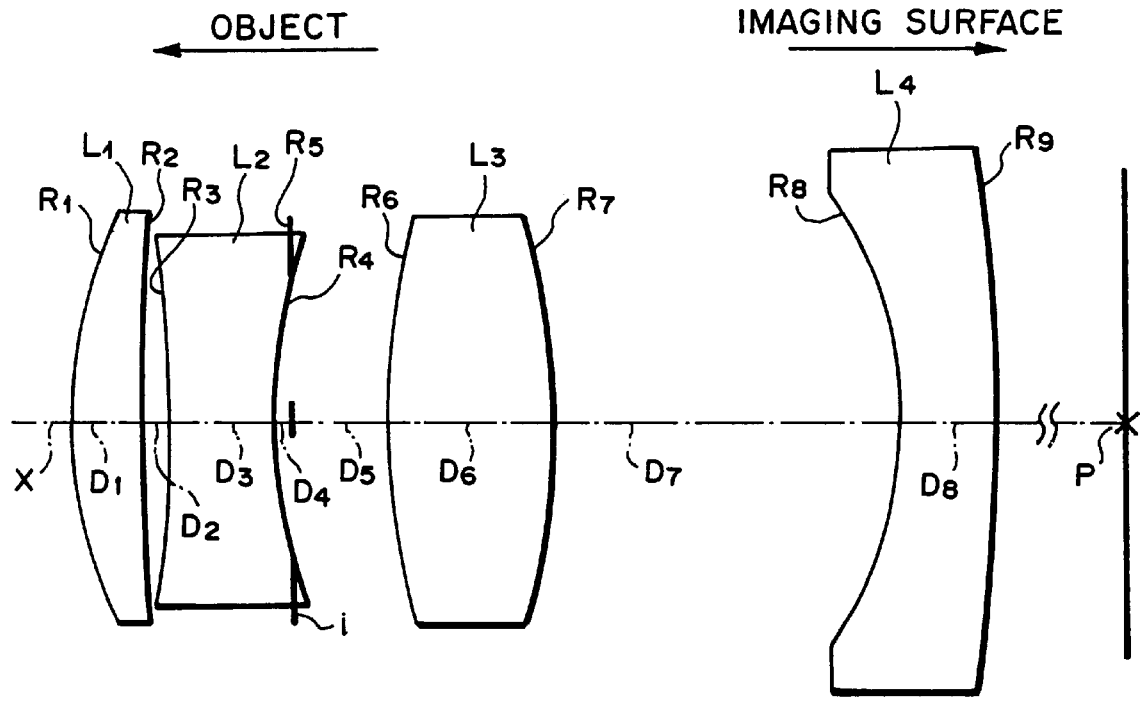
FIG. 2 is a schematic view showing a basic lens configuration in accordance with Examples 3 and 4 of the present invention.
Figure 4A:
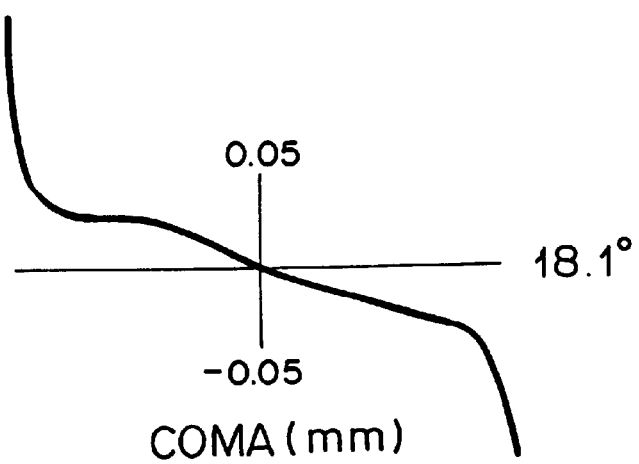
FIGS. 4A, 4B, 4C and 4D are aberration charts (indicating coma) of the lens in accordance with Example 1.
Figure 4B:
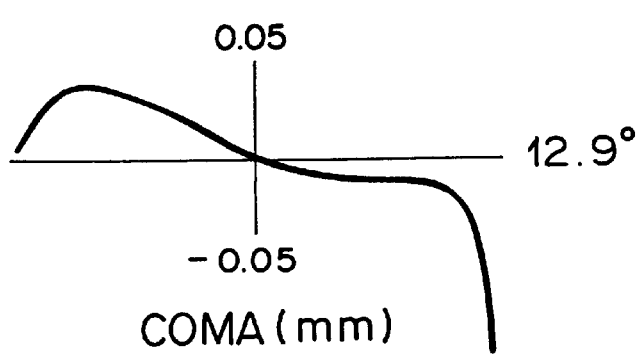
Figure 4C:
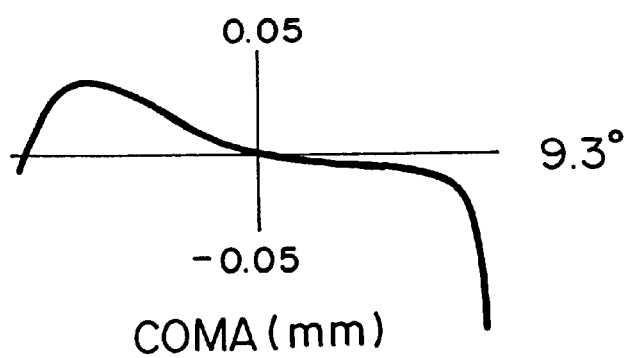
Figure 4D:
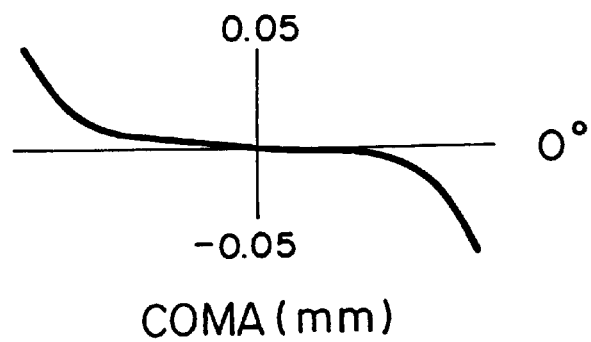
Figure 6A:
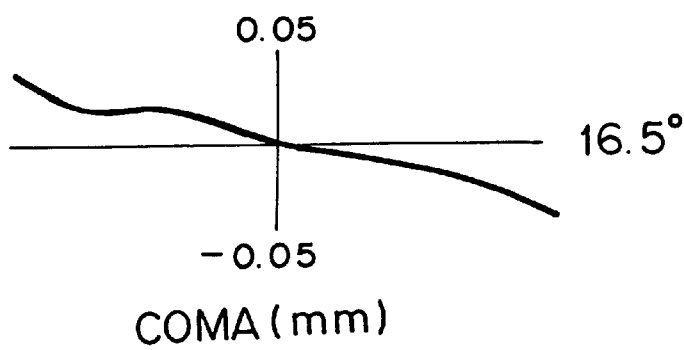
FIGS. 6A, 6B, 6C and 6D are aberration charts (indicating coma) of the lens in accordance with Example 2.
Figure 6B:
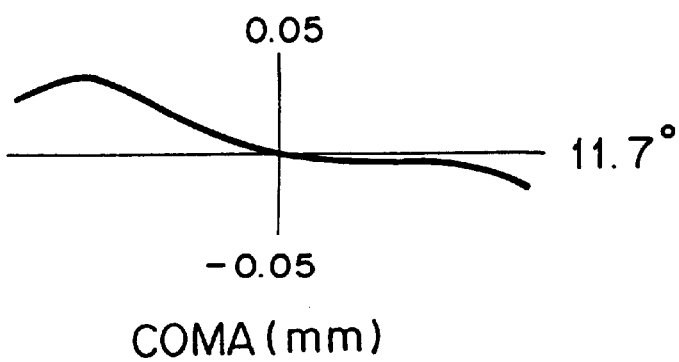
Figure 6C:
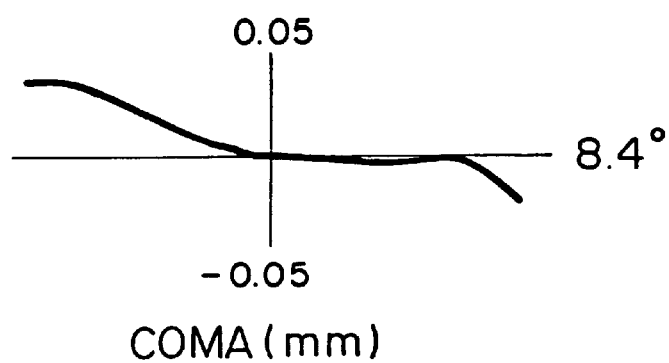
Figure 6D:
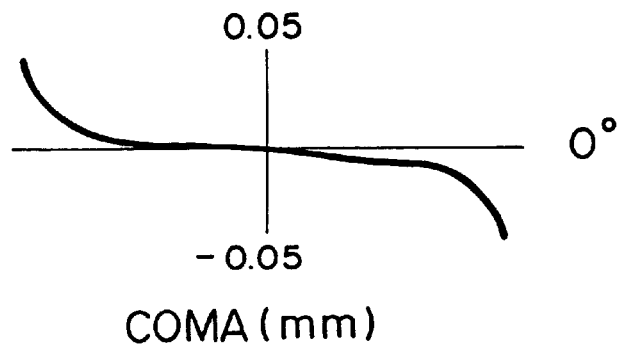
Figure 10A:
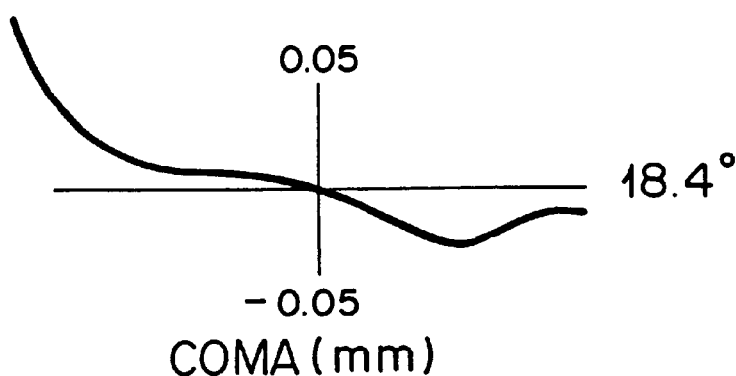
FIGS. 10A, 10B, 10C and 10D are aberration charts (indicating coma) of the lens in accordance with Example 4.
Figure 10B:
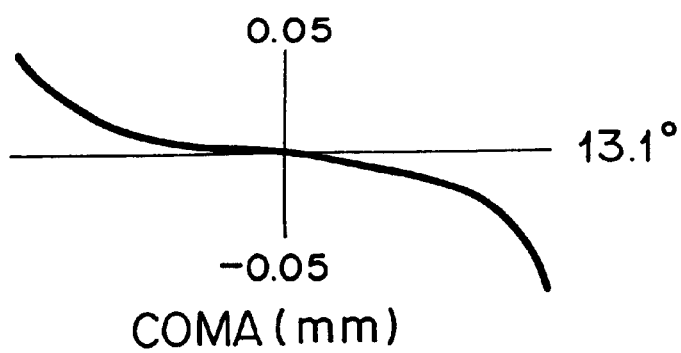
Figure 10C:
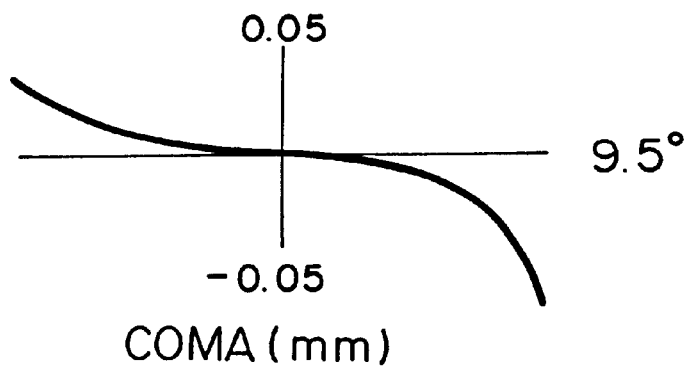
Figure 10D:
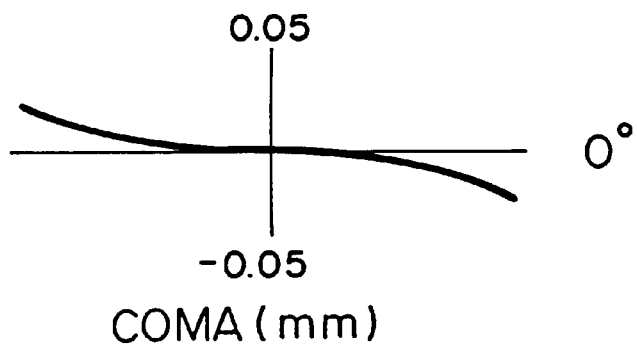

Here, FIG. 1 shows a basic lens configuration of Examples 1 and 2, whereas FIG. 2 shows a basic lens configuration of Examples 3 and 4.

As shown in FIGS. 1 and 2, the imaging lens (readout lens) for reading out images in accordance with these examples is constituted by four lenses $L_1$ to $L_4$, whereas a stop i is disposed between the second lens $L_2$ and the third lens $L_3$, whereby the luminous flux incident thereon along the optical axis X from the object side forms an image at an imaging position P.

Here, the first lens $L_1$ is a positive meniscus lens having a convex surface directed onto the object side, the second lens $L_2$ is a biconcave lens having a surface with a greater curvature directed onto the imaging surface side, the third lens $L_3$ is a biconvex lens, and the fourth lens $L_4$ is a negative meniscus lens having a convex surface directed onto the imaging surface side.

Also, these lenses satisfy the following conditional expressions:

$$1.38 < f(1/R_9 - 1/R_8) < 2.38 \quad (1)$$

$$0.28 < R_1/f < 0.58 \quad (2)$$

$$0.23 < D_7/f < 0.46 \quad (3)$$

$$0.71 < |D_4 \times f_2|/f < 1.98 \quad (4)$$

$$1.14 < |N_4 \times f_4|/f < 1.90 \quad (5)$$

where f is the composite focal length of the whole lens system;

$f_2$ is the focal length of the second lens;

$f_4$ is the focal length of the fourth lens;

$R_i$ is the radius of curvature of the i-th surface;

$D_i$ is the distance between the i-th surface and the (i+1)-th surface; and $N_4$ is the refractive index of the fourth lens at e-line.

In the above-mentioned image readout lens, the positive first lens $L_1$, the negative second lens $L_2$, the positive third lens $L_3$, and the negative fourth lens $L_4$ are disposed successively from the object side, so that the pair of the first and second lenses and the pair of the third and fourth lenses are each composed of positive and negative lenses. As a consequence, the aberration generated in the lens on the front side of each pair is corrected by the lens on the rear side before being enhanced, whereby the aberration can efficiently be corrected.

Further, when at least one surface of at least one of the first lens $L_1$ and third lens $L_3$ is formed as an aspheric surface, the spherical aberration can be corrected favorably, so as to yield a bright lens.

Technical significance of the above-mentioned conditional expressions (1) to (5) will now be explained.

The above-mentioned conditional expression (1) defines the difference in curvature between both surfaces of the fourth lens $L_4$, i.e., $1/R_9 - 1/R_8$, with respect to the composite focal length f of the whole lens system.

If the lower limit of this conditional expression (1) is not satisfied, distortion may enhance. Outside the upper and lower limits, on the other hand, coma is harder to correct favorably.

Hence, both distortion and coma can be made favorable if this conditional expression (1) is satisfied.

The above-mentioned conditional expression (2) is a conditional expression concerning the power of the first lens $L_1$, defining the ratio of the radius of curvature $R_1$ of the first surface of the first lens $L_1$ to the composite focal length f of the whole lens system, $R_1/f$.

On the other hand, the above-mentioned conditional expression (3) is a conditional expression defining the ratio of the distance $D_7$ between the third lens $L_3$ and fourth lens $L_4$ to the composite focal length f of the whole lens system, $D_7/f$.

Though values of $R_1/f$ and $D_7/f$ exceeding the respective upper limits of conditional expressions (2) and (3) are advantageous in terms of aberration correction, the length of the whole lens system would consequently increase, thereby contradicting the demands for making the lens system compact. If the value of $R_1/f$ or $D_7/f$ is smaller than the lower limit thereof, on the other hand, then the imaging surface will tilt toward the lens greatly, thereby increasing astigmatism.

Hence, when these conditional expressions (2) and (3) are satisfied, the lens system can be made compact, while astigmatism is made favorable.

The above-mentioned conditional expression (4) defines the ratio of the product of the distance $D_4$ between the second lens $L_2$ and the stop i and the focal length $f_2$ of the second lens $L_2$ to the composite focal length f of the whole lens system, $|D_4 \times f_2|/f$.

If the value of $|D_4 \times f_2|/f$ exceeds the upper limit of conditional expression (4), then coma is harder to correct. It will be advantageous for aberration correction if the value of $|D_4 \times f_2|/f$ is smaller than the lower limit of conditional expression (4). In this case, however, the resultant position of the stop i may be so close to the second lens $L_2$ that the stop i cannot be disposed in practice.

Hence, coma can be made favorable if this conditional expression (4) is satisfied.

The above-mentioned conditional expression (5) defines the ratio of the product of the refractive index $N_4$ of the fourth lens $L_4$ and the focal length $f_4$ thereof to the composite focal length f of the whole lens system, $|N_4 \times f_4|/f$.

If the value of $|N_4 \times f_4|/f$ exceeds the upper limit of this conditional expression (5), then distortion may increase. If the value of $|N_4 \times f_4|/f$ is outside the upper or lower limit, on the other hand, coma is harder to correct.

Hence, both distortion and coma can be corrected favorably when this conditional expression (5) is satisfied.

In the following, each of Examples 1 to 4 will be explained with reference to specific numerical values.

EXAMPLE 1

The upper part of the following Table 1 indicates the radius of curvature R (mm) of each lens surface, center thickness of each lens and air space between each pair of neighboring lenses D (mm), refractive index N of each lens at e-line, and Abbe number ν of each lens in Example 1.

In Table 1 and Tables 2 to 8 which will be explained later, numbers referring to letters R, D, N, and ν successively increase from the object side.

The middle part of Table 1 shows the respective values of focal length f, F number, half angle of view ω, and imaging magnification m of the whole lens system in the image readout lens in accordance with Example 1.

Further, the lower part of Table 1 shows numerical values corresponding to the above-mentioned conditional expressions (1) to (5) in Example 1.

Each of the surfaces whose surface number is marked with "*" on the left side in Table 1 is an aspheric surface having an aspheric surface form represented by the following expression (A):

$$X = \frac{Ch^2}{1+\sqrt{1-KC^2h^2}} + a_4h^4 + a_6h^6 + a_8h^8 + a_{10}h^{10} \quad (A)$$

where
- X is the length (mm) of the perpendicular to the tangential plane (the plane perpendicular to the optical axis) of an apex of the aspheric surface from a point on the aspheric surface at a height h from the optical axis;
- C is the paraxial curvature of the aspheric surface (1/R);
- h is the height (mm) from the optical axis;
- K is the eccentricity; and
- $a_4$, $a_6$, $a_8$, and $a_{10}$ are the fourth-, sixth-, eighth-, and tenth-order aspheric surface coefficients, respectively.

The following Table 2 shows values of the individual constants K, $a_4$, $a_6$, $a_8$, and $a_{10}$ shown in the above-mentioned expression (A).

As can be seen from Table 1, Example 1 satisfies all of the above-mentioned conditional expressions (1) to (5). Also, its wideness of angle of view and brightness are sufficient for the image readout lens.

EXAMPLE 2

The upper part of the following Table 3 indicates the radius of curvature R (mm) of each lens surface, center thickness of each lens and air space between each pair of neighboring lenses D (mm), refractive index N of each lens at e-line, and Abbe number ν of each lens in Example 2.

The middle part of Table 3 shows the respective values of focal length f, F number, half angle of view ω, and imaging magnification m of the whole lens system in the image readout lens in accordance with Example 2.

Further, the lower part of Table 3 shows numerical values corresponding to the above-mentioned conditional expressions (1) to (5) in Example 2.

Each of the surfaces whose surface number is marked with "*" on the left side in Table 3 is an aspheric surface having an aspheric surface form represented by the above-mentioned expression (A).

The following Table 4 shows values of the individual constants K, $a_4$, $a_6$, $a_8$, and $a_{10}$ shown in the above-mentioned expression (A).

As can be seen from Table 3, Example 2 satisfies all of the above-mentioned conditional expressions (1) to (5). Also, its wideness of angle of view and brightness are sufficient for the image readout lens.

EXAMPLE 3

The upper part of the following Table 5 indicates the radius of curvature R (mm) of each lens surface, center thickness of each lens and air space between each pair of neighboring lenses D (mm), refractive index N of each lens at e-line, and Abbe number ν of each lens in Example 3.

The middle part of Table 5 shows the respective values of focal length f, F number, half angle of view ω, and imaging magnification m of the whole lens system in the image readout lens in accordance with Example 3.

Further, the lower part of Table 5 shows numerical values corresponding to the above-mentioned conditional expressions (1) to (5) in Example 3.

Each of the surfaces whose surface number is marked with "*" on the left side in Table 5 is an aspheric surface having an aspheric surface form represented by the above-mentioned expression (A).

The following Table 6 shows values of the individual constants K, $a_4$, $a_6$, $a_8$, and $a_{10}$ shown in the above-mentioned expression (A).

As can be seen from Table 5, Example 3 satisfies all of the above-mentioned conditional expressions (1) to (5). Also, its wideness of angle of view and brightness are sufficient for the image readout lens.

EXAMPLE 4

The upper part of the following Table 7 indicates the radius of curvature R (mm) of each lens surface, center thickness of each lens and air space between each pair of neighboring lenses D (mm), refractive index N of each lens at e-line, and Abbe number ν of each lens in Example 4.

The middle part of Table 7 shows the respective values of focal length f, F number, half angle of view ω, and imaging magnification m of the whole lens system in the image readout lens in accordance with Example 4.

Further, the lower part of Table 7 shows numerical values corresponding to the above-mentioned conditional expressions (1) to (5) in Example 4.

Each of the surfaces whose surface number is marked with "*" on the left side in Table 7 is an aspheric surface having an aspheric surface form represented by the above-mentioned expression (A).

The following Table 8 shows values of the individual constants K, $a_4$, $a_6$, $a_8$, and $a_{10}$ shown in the above-mentioned expression (A).

As can be seen from Table 7, Example 4 satisfies all of the above-mentioned conditional expressions (1) to (5). Also, its wideness of angle of view and brightness are sufficient for the image readout lens.

FIGS. 3, 5, 7, and 9 show respective aberration charts (each showing spherical aberration, astigmatism, and distortion) of Examples 1 to 4. In these aberration charts, ω indicates the half angle of view. On the other hand, FIGS. 4, 6, 8, and 10 show respective aberration charts indicating coma of Examples 1 to 4.

As can be seen from FIGS. 3 to 10, all kinds of aberration mentioned above can be made favorable in accordance with each of the above-mentioned Examples.

Each spherical aberration chart indicates respective aberrations for e-line, g-line, and C-line. Each astigmatism chart indicates respective aberrations for sagittal (S) and tangential (T) image surfaces.

Without being restricted to the above-mentioned examples, the image readout apparatus in accordance with the present invention can be modified in various manners. For example, the radius of curvature R and lens space (or lens thickness) D of each lens can be changed as appropriate.

As explained in the foregoing, the image readout lens in accordance with the present invention is configured so as to attain a wider angle of view, while attention is being paid so as not to deteriorate various kinds of aberration, whereby the angle of view can be widened while various kinds of aberration are being corrected favorably. Also, this image readout lens can be made as a bright lens system.

Further, according to the image readout apparatus using the image readout lens of the present invention, the quality of readout images can be made favorable over a wide angle.

TABLE 1

| Surface | R | D | N | ν |
|---|---|---|---|---|
| *1 | 35.575 | 7.54 | 1.69661 | 53.4 |
| *2 | 84.221 | 4.02 | | |
| 3 | −138.61 | 11.64 | 1.73431 | 28.3 |
| 4 | 50.088 | 2.27 | | |
| 5 | ∞ | 3.73 | | |
| 6 | 66.772 | 9.91 | 1.77621 | 49.6 |
| 7 | −63.999 | 29.22 | | |
| 8 | −29.788 | 11.17 | 1.71616 | 53.9 |
| 9 | −62.849 | | | |

$f = 100$   $F/3.0$   $\omega = 18.1°$   $m = 0.110$ (1) $f(1/R_9 - 1/R_8) = 1.766$
(2) $R_1/f = 0.356$
(3) $D_7/f = 0.292$
(4) $|D_4 \cdot f_2|/f = 1.106$
(5) $|N_4 \cdot f_4|/f = 1.580$

TABLE 2

| | K | $a_4$ | $a_6$ | $a_8$ | $a_{10}$ |
|---|---|---|---|---|---|
| 1st surface | 1.507 | $6.43 \times 10^{-8}$ | $1.35 \times 10^{-9}$ | $3.55 \times 10^{-12}$ | $-4.65 \times 10^{-15}$ |
| 2nd surface | 2.860 | $3.47 \times 10^{-6}$ | $5.70 \times 10^{-9}$ | $7.64 \times 10^{-13}$ | $1.24 \times 10^{-16}$ |

TABLE 3

| Surface | R | D | N | ν |
|---|---|---|---|---|
| *1 | 36.207 | 7.30 | 1.69661 | 53.4 |
| *2 | 88.730 | 5.00 | | |
| 3 | −133.02 | 10.46 | 1.73431 | 28.3 |
| 4 | 48.876 | 2.98 | | |
| 5 | ∞ | 3.80 | | |
| 6 | 66.843 | 9.15 | 1.77621 | 49.6 |
| 7 | −63.761 | 30.71 | | |
| 8 | −29.988 | 9.80 | 1.71616 | 53.9 |
| 9 | −62.454 | | | |

$f = 100$   $F/3.0$   $\omega = 16.5°$   $m = 0.110$ (1) $f(1/R_9 - 1/R_8) = 1.734$
(2) $R_1/f = 0.362$
(3) $D_7/f = 0.307$
(4) $|D_4 \cdot f_2|/f = 1.416$
(5) $|N_4 \cdot f_4|/f = 1.582$

TABLE 4

| | K | $a_4$ | $a_6$ | $a_8$ | $a_{10}$ |
|---|---|---|---|---|---|
| 1st surface | 1.645 | $-3.81 \times 10^{-7}$ | $1.18 \times 10^{-9}$ | $3.59 \times 10^{-12}$ | $-4.80 \times 10^{-15}$ |
| 2nd surface | 2.807 | $3.18 \times 10^{-6}$ | $6.01 \times 10^{-9}$ | $8.90 \times 10^{-13}$ | $-7.69 \times 10^{-17}$ |

TABLE 5

| Surface | R | D | N | ν |
|---|---|---|---|---|
| 1 | 47.944 | 7.38 | 1.83932 | 37.2 |
| 2 | 244.07 | 2.89 | | |
| 3 | −138.42 | 11.33 | 1.81266 | 25.4 |
| 4 | 57.767 | 1.83 | | |
| 5 | ∞ | 10.26 | | |
| *6 | 74.513 | 18.13 | 1.69661 | 53.4 |
| *7 | −70.826 | 38.53 | | |
| 8 | −40.144 | 10.55 | 1.55963 | 48.5 |
| 9 | −193.35 | | | |

$f = 100$   $F/3.0$   $\omega = 18.40$   $m = 0.110$ (1) $f(1/R_9 - 1/R_8) = 1.974$
(2) $R_1/f = 0.479$
(3) $D_7/f = 0.385$
(4) $|D_4 \cdot f_2|/f = 0.893$
(5) $|N_4 \cdot f_4|/f = 1.448$

TABLE 6

| | K | $a_4$ | $a_6$ | $a_8$ | $a_{10}$ |
|---|---|---|---|---|---|
| 6th surface | 0.345 | $-3.50 \times 10^{-7}$ | $-1.49 \times 10^{-11}$ | $2.25 \times 10^{-14}$ | $1.78 \times 10^{-17}$ |
| 7th surface | 0.841 | $3.91 \times 10^{-7}$ | $1.66 \times 10^{-12}$ | $-2.24 \times 10^{-14}$ | $-2.01 \times 10^{-17}$ |

TABLE 7

| Surface | R | D | N | ν |
|---|---|---|---|---|
| 1 | 46.189 | 6.78 | 1.85621 | 32.4 |
| 2 | 183.78 | 2.11 | | |
| 3 | −146.64 | 9.46 | 1.85502 | 23.9 |
| 4 | 57.190 | 2.70 | | |
| 5 | ∞ | 9.21 | | |
| *6 | 63.180 | 18.09 | 1.69661 | 53.4 |
| *7 | −73.822 | 38.43 | | |
| 8 | −33.342 | 11.30 | 1.60660 | 42.5 |
| 9 | −98.650 | | | |

$f = 100$   $F/3.0$   $\omega = 18.4°$   $m = 0.110$ (1) $f(1/R_9 - 1/R_8) = 1.986$
(2) $R_1/f = 0.462$
(3) $D_7/f = 0.384$
(4) $|D_4 \cdot f_2|/f = 1.273$
(5) $|N_4 \cdot f_4|/f = 1.427$

TABLE 8

| | K | $a_4$ | $a_6$ | $a_8$ | $a_{10}$ |
|---|---|---|---|---|---|
| 6th surface | 0.355 | $-3.42 \times 10^{-7}$ | $1.73 \times 10^{-11}$ | $1.66 \times 10^{-14}$ | $3.64 \times 10^{-18}$ |
| 7th surface | 0.860 | $3.84 \times 10^{-7}$ | $-4.77 \times 10^{-11}$ | $-3.20 \times 10^{-11}$ | $-1.07 \times 10^{-17}$ |

What is claimed is:

1. An image readout lens comprising, successively from an object side, a first lens made of a positive meniscus lens having a convex surface directed onto the object side, a second lens made of a biconcave lens, a third lens made of a biconvex lens, and a fourth lens made of a negative meniscus lens having a convex surface directed onto an imaging surface side, wherein at least one surface in at least one of said first and third lenses is an aspheric surface, wherein a stop is disposed between said second and third lenses and satisfying the following conditional expressions (1), (2), and (3):

$$1.38 < f(1/R_9 - 1/R_8) < 2.38 \tag{1}$$

$$0.28 < R_1/f < 0.58 \tag{2}$$

$$0.27 < D_7/f < 0.46 \tag{3}$$

where f is the composite focal length of the whole lens system;

$R_i$ is the radius of curvature of the i-th surface; and $D_i$ is the distance between the i-th surface and the (i+1)-th surface.

2. An image readout lens according to claim 1, satisfying the following conditional expression (4):

$$0.71 < |D_4 \times f_2|/f < 1.52 \qquad (4)$$

where f is the composite focal length of the whole lens system;

$f_2$ is the focal length of the second lens; and $D_i$ is the distance between the i-th surface and the (i+1)-th surface.

3. An image readout lens according to claim 1, satisfying the following conditional expression (5):

$$1.14 < |N_4 \times f_4 < |f < 1.90 \qquad (5)$$

where f is the composite focal length of the whole lens system;

$f_4$ is the focal length of the fourth lens; and $N_4$ is the refractive index of the fourth lens at e-line.

4. An image readout apparatus using the image readout lens according to claim 1.

* * * * *